July 11, 1950 — G. R. WADLEIGH — 2,515,166
DISCHARGE HOPPER
Filed April 27, 1946 — 3 Sheets-Sheet 1

INVENTOR
GEORGE R. WADLEIGH
BY
ATTORNEYS

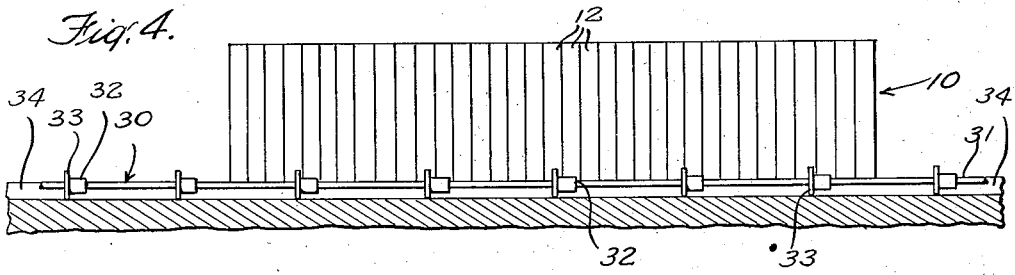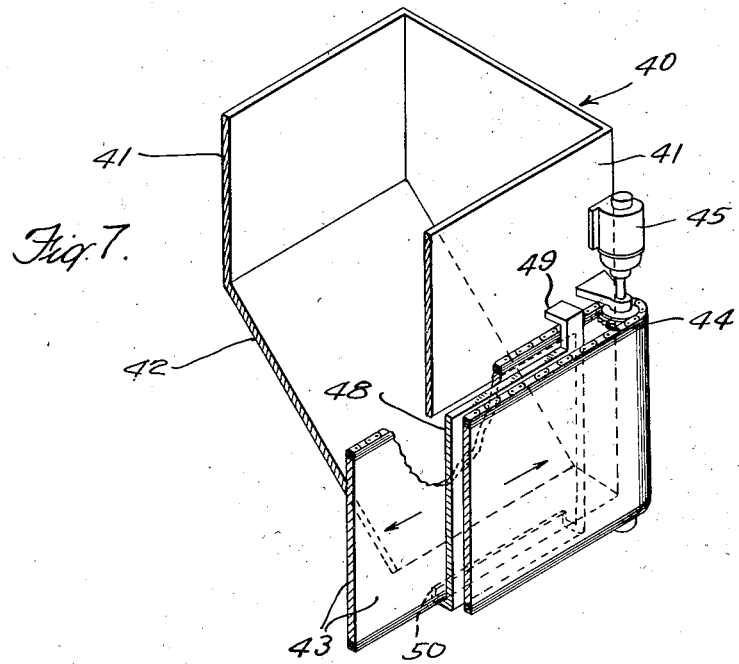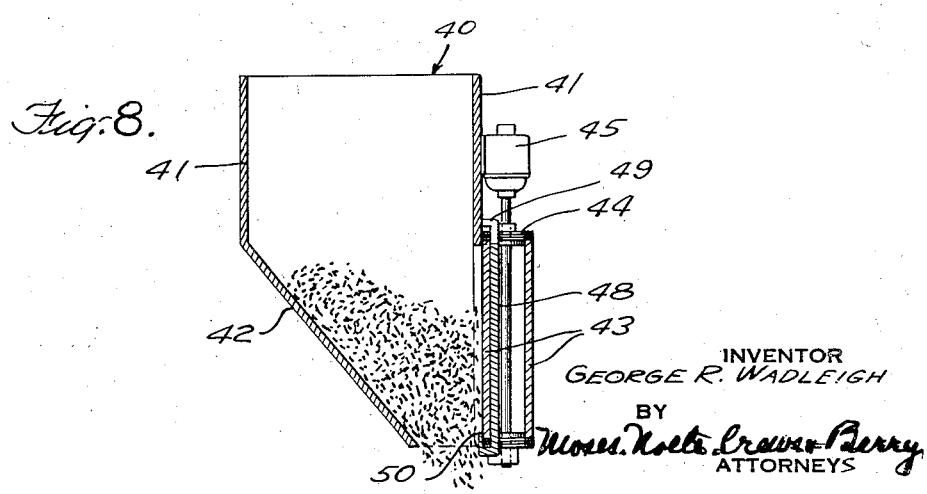

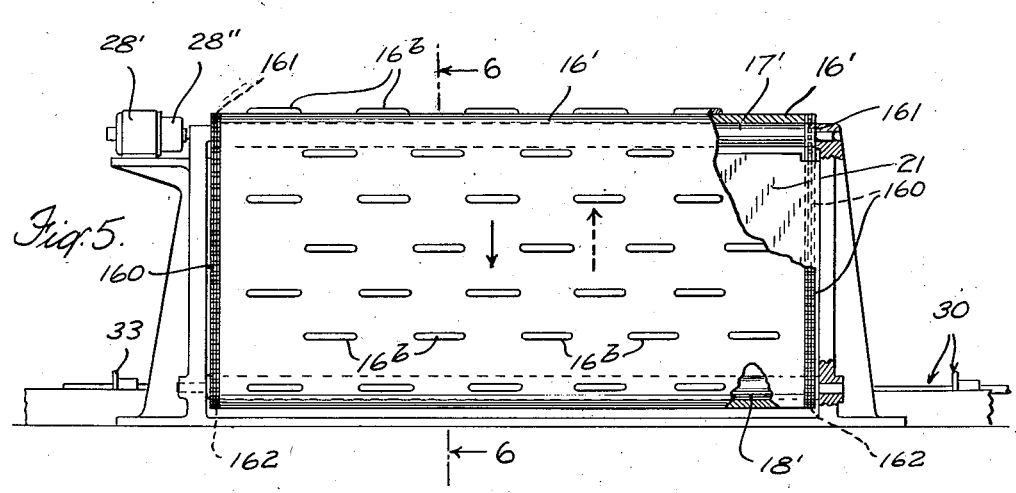
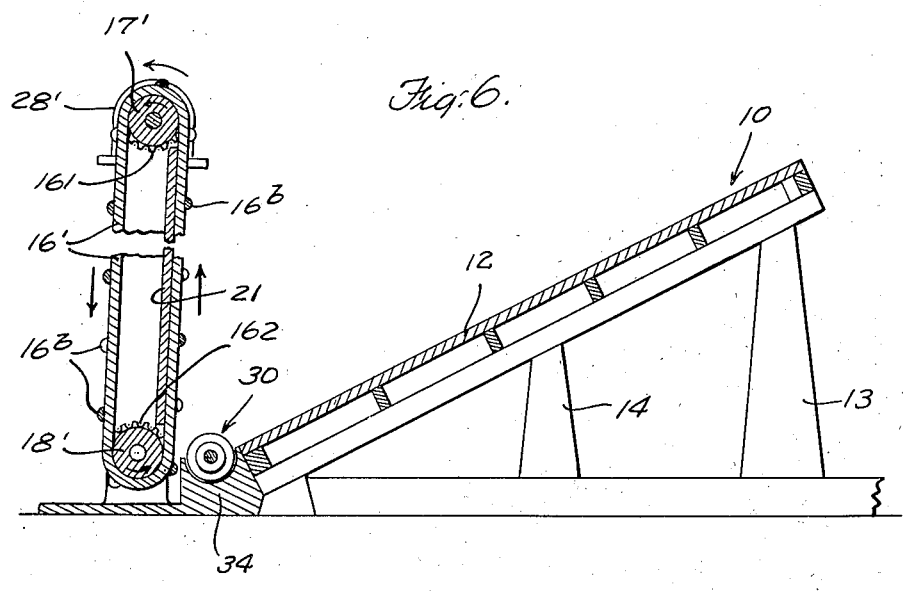

UNITED STATES PATENT OFFICE 2,515,166

DISCHARGE HOPPER

George R. Wadleigh, Hastings on Hudson, N. Y., assignor of one-half to West Virginia Pulp and Paper Company, New York, N. Y., a corporation of Delaware Application April 27, 1946, Serial No. 665,449

3 Claims. (Cl. 198—30)

My present invention relates to improvements in discharge hoppers and in systems of material handling involving same. More particularly, my invention is concerned with means for effecting discharge from the hopper of materials such as sticks of pulpwood or other material having one dimension considerably greater than the others, which have a tendency to jam in the discharge outlet of the hopper, as well as other materials such as wood chips which tend to arch over and pack and which do not flow freely from a discharge hopper or bin.

In the case of sticks of wood or other material, it is frequently desirable not only to insure their ready discharge from a hopper or bin wherein they are stored, but also to cause them to leave the hopper in substantially the same orientation, i. e., parallel to the same axis. Such orientation is necessary when it is desired to feed the sticks onto a conveyor of the type which holds the sticks in tandem and parallel to the line of movement. My improved hopper is also of usefulness where sticks are received from one conveyor continuously or intermittently and it is desired further to transport them in a direction at an angle to the direction of the first conveyor. In such case the first conveyor deposits the sticks in the hopper, whereupon they are fed down through the hopper onto the second conveyor in the manner above described, the second conveyor running at an angle to the first conveyor.

For the accomplishment of these and related ends the improved hopper of my invention has one wall constituted of an endless movable surface or apron, as for example a belt, or series of parallel chains or the like. Where sticks of wood or other similar objects are to be transported I preferably dispose of a conveyor of the type above mentioned adjacent the discharge opening of the hopper.

It is well known that the chief cause of the inability of divided material freely to flow from a hopper is the formation of arches in the material. The formation of the arch is promoted by the oppositely inclined walls of the hopper which form skewbacks for the arch. Hence it will be seen that by having one wall of the hopper constituted of a moving surface, the tendency to arch formation is counteracted. Such tendancy may likewise be counteracted by having either of the two walls reversely inclined (as exemplified by the apron 16, Fig. 3, to be described), thus giving a reverse slope to a possible skewback.

My invention will be best understood by reference to the following detailed description taken with the annexed drawings in which:

Fig. 4 is a front view of the hopper with the conveyor side removed;

Fig. 5 shows a hopper similar to Fig. 1 but with the apron having an up and down movement;

Fig. 6 is a sectional view taken on line 6—6 of Fig. 5;

Fig. 7 is a perspective view, with parts broken away of a modification useful for difficult, dischargeable divided material such as wood chips and the like;

Fig. 8 is a view as seen from the left of Fig. 7.

Figure 1:
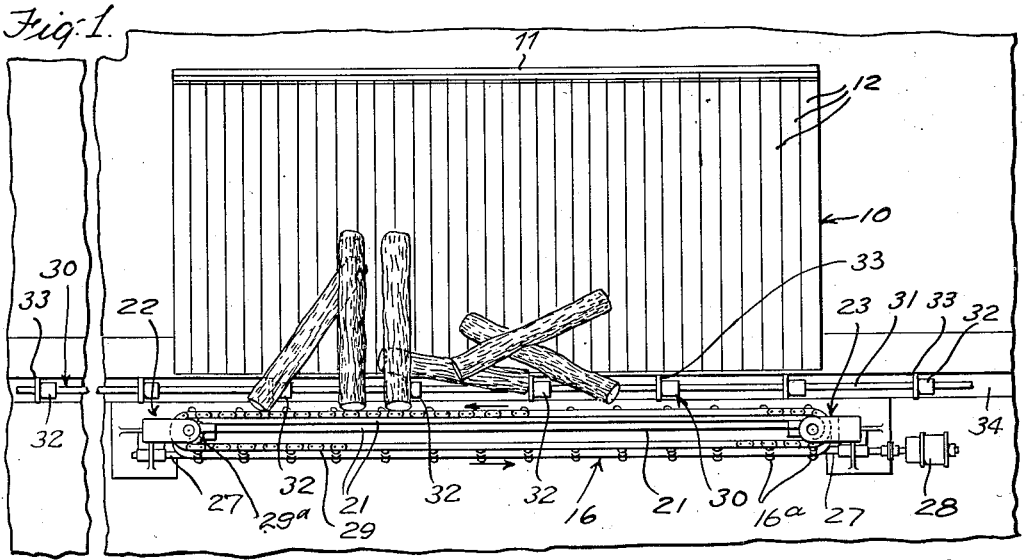
Fig. 1 is a plan view of a preferred embodiment.
Figure 3:
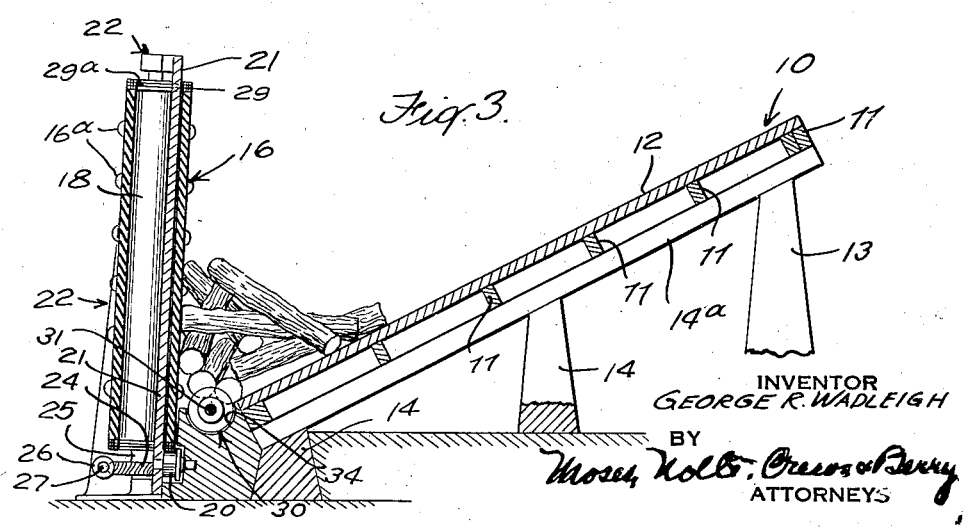
Fig. 3 is a view on an enlarged scale taken on line 3—3 of Fig. 2.

As will be evident from Figures 1, 3 and 4, the hopper consists of a stationary side 10 which may make such an angle with the ground as to afford as large a capacity of the hopper as possible for the material dealt with, such side comprising substantially horizontal beams 11 to which are secured slats or boards 12, the whole side being supported by uprights 13, 14 and transverse pieces 14a all of known construction. As shown in the drawings, the side 10 which makes a comparatively slight angle with the horizontal, acts as a receiving platform for the wood which is dumped thereon helter-skelter.

The opposite side of the hopper is constituted in the embodiment under description of an endless apron 16 which passes around a pulley or roller 17 at one end, and to a similar pulley or roller 18 at the other end, the axes of said rollers making a comparatively slight angle to the vertical, whereas the bottom edge of the apron is preferably supported on flanged rollers 20, which may be journaled in a flat frame member 21 which extends from a vertically extending support 22 at one end to a similar support 23 at the opposite end, such supports 22, 23 also serving as journals for the rollers 17, 18. Member 21 also serves as a backing for the apron 16. The latter may also be provided with protuberances 16a of a suitable nature for better engaging the contents of the hopper. For driving the roller 17 a worm wheel 24 is provided which is secured on a trunnion 25 of said roller, the worm wheel 24 being driven by worm 26 on shaft 27 which is driven by motor 28, said shaft 27 if desired also driving roller 18 by similarly identified elements. As shown, apron 16 has chains 29 at either edge of same which engage sprockets 29a on rollers 17, 18, Between the apron 16 and the side 10 is a conveyor denoted generally by 30, which in the case of logs and the like is desirably of the type consisting of a flexible steel cable 31 to which are secured at intervals flanged (flanges 32) collars 33 by means not shown. Collars 33 are caused to slide in a supporting trough 34, as is well understood in the art.

Figure 2:
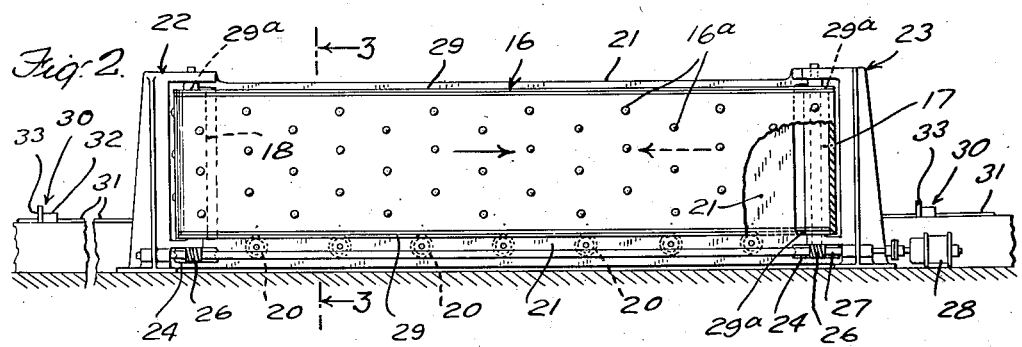
Fig. 2 is a view partly in section of a front elevation thereof.

Figures 5 and 6 show a further modification in which rollers denoted 17', 18' are parallel to the conveyor 30, whereby the apron 16' has a preferably upward movement with respect to the contents of the hopper. For accomplishing this the roller 17' is driven by means of motor 28' and speed reducer 28''. As shown in Figures 5 and 6, apron 16' is joined to chains 160, 160 at the sides thereof engaging which are sprockets 161 on roller 17' and sprockets 162 on roller 18'. The apron 16' is equipped with elongated protuberances 16b similar to those shown in Figures 1 to 3.

In use the effect of the moving apron 16 will be to move the ends of the sticks in contact therewith so as to break down any arching and bring them into parallelism with the conveyor 30, in which position they will fall into the throat between the apron 16 and the side 10 and be gripped or pushed by the engaging flanges 33. For this purpose the apron 16 may be driven in the same direction as but at a less speed than the conveyor 30; or, it may be moved in a direction opposite to the direction of the conveyor 30 or in a vertically upward direction, as in Figs. 5 and 6. Preferably in both forms the top of the apron 16 or 16' is inclined slightly from the vertical toward the wall 10 in order to constitute a skewback having a reverse slope whereby further to prevent arching of the hopper contents.

Figures 7 and 8 show a hopper denoted generally by 40 having vertical walls 41 and slanting bottom wall 42 and an opposing apron 43 constituting a continuation of the vertical wall 41. Apron 43 may be driven by and supported on a pair of rollers of which one, 44, is shown, driven by motor 45.

In order to provide a support for the apron 43 a flat backing member 48 is provided, which is attached to the hopper wall 41 by a plurality of brackets one of which, 49, is shown. Support 48 may have a turned over portion 50 in order to act as a guide for the apron and insure against sagging.

Various modifications may be had without departing from the spirit of my invention or the scope of the appended claims. For example, in lieu of constituting the apron 16 by a belt it may likewise be constituted by a chain or series of chains, which also has the advantage of affording a gripping action on the ends of the sticks of wood. Further, while the hopper of Fig. 1 is shown without end walls, these may be had if desired.

I claim:

1. A discharge hopper for pulp wood sticks and material of like shape adapted to have same dumped therein helter-skelter and to deliver the individual sticks lengthwise and in parallel relationship one to the other, said hopper being comprised of opposite walls inclined one to another and forming at their point of closest approach a discharge aperture narrower than the length of a wood stick, one of said walls making a comparatively small angle with the horizontal whereby it acts as a receiving platform for the material to be handled, the other of said walls being constituted by an endless traveling apron against which the wood is partially supported, said traveling apron making a comparatively slight angle with the vertical, and a conveyor beneath said aperture to receive sticks discharged therethrough.

2. A discharge hopper according to claim 1 in which said conveyor moves substantially parallel to the axis of said aperture.

3. A discharge hopper according to claim 1 having pulleys around which said endless belt travels, supports for the lower edge of said belt comprising a plurality of rollers upon which the lower edge of said belt rests.

GEORGE R. WADLEIGH.

REFERENCES CITED

The following references are of record in the file of this patent:

UNITED STATES PATENTS

| Number | Name | Date |
|---|---|---|
| 833,141 | Van Nouhuys | Oct. 9, 1906 |
| 1,481,152 | Rehbein | Jan. 15, 1924 |
| 1,586,310 | Johnson | May 25, 1926 |
| 1,957,921 | Okins | Aug. 31, 1926 |
| 1,644,078 | Lavery | Mar. 27, 1928 |
| 2,185,949 | Regensburger | Jan. 2, 1940 |